United States Patent [19]
Nead

[11] 3,870,871
[45] Mar. 11, 1975

[54] VECTOR MAGNITUDE SUMMING CIRCUIT

[76] Inventor: Thomas Edward Nead, 11645 Thistlehill Dr., Loveland, Ohio 45140

[22] Filed: Nov. 29, 1973

[21] Appl. No.: 420,066

[52] U.S. Cl. ............ 235/197, 235/151.11, 235/192, 235/193.5, 318/571
[51] Int. Cl. .............................................. G06g 7/22
[58] Field of Search ........ 235/197, 198, 193.5, 192, 235/151.11, 186; 340/324 A, 324 R; 318/571, 573

[56] References Cited
UNITED STATES PATENTS

| | | | |
|---|---|---|---|
| 3,617,718 | 11/1971 | Dummermuth | 235/151.11 |
| 3,633,013 | 1/1972 | Dummermuth | 318/571 X |
| 3,638,214 | 1/1972 | Scott et al. | 235/198 X |
| 3,725,897 | 4/1973 | Bleiweiss | 235/151 X |

*Primary Examiner*—Joseph F. Ruggiero

[57] ABSTRACT

An apparatus is disclosed for summing two input signals having magnitudes representing the magnitude of quantities occurring in perpendicular directions. The apparatus is operative to produce an output signal having a magnitude representing approximately the square root of the sum of the squares of the magnitudes of the input signals.

10 Claims, 1 Drawing Figure

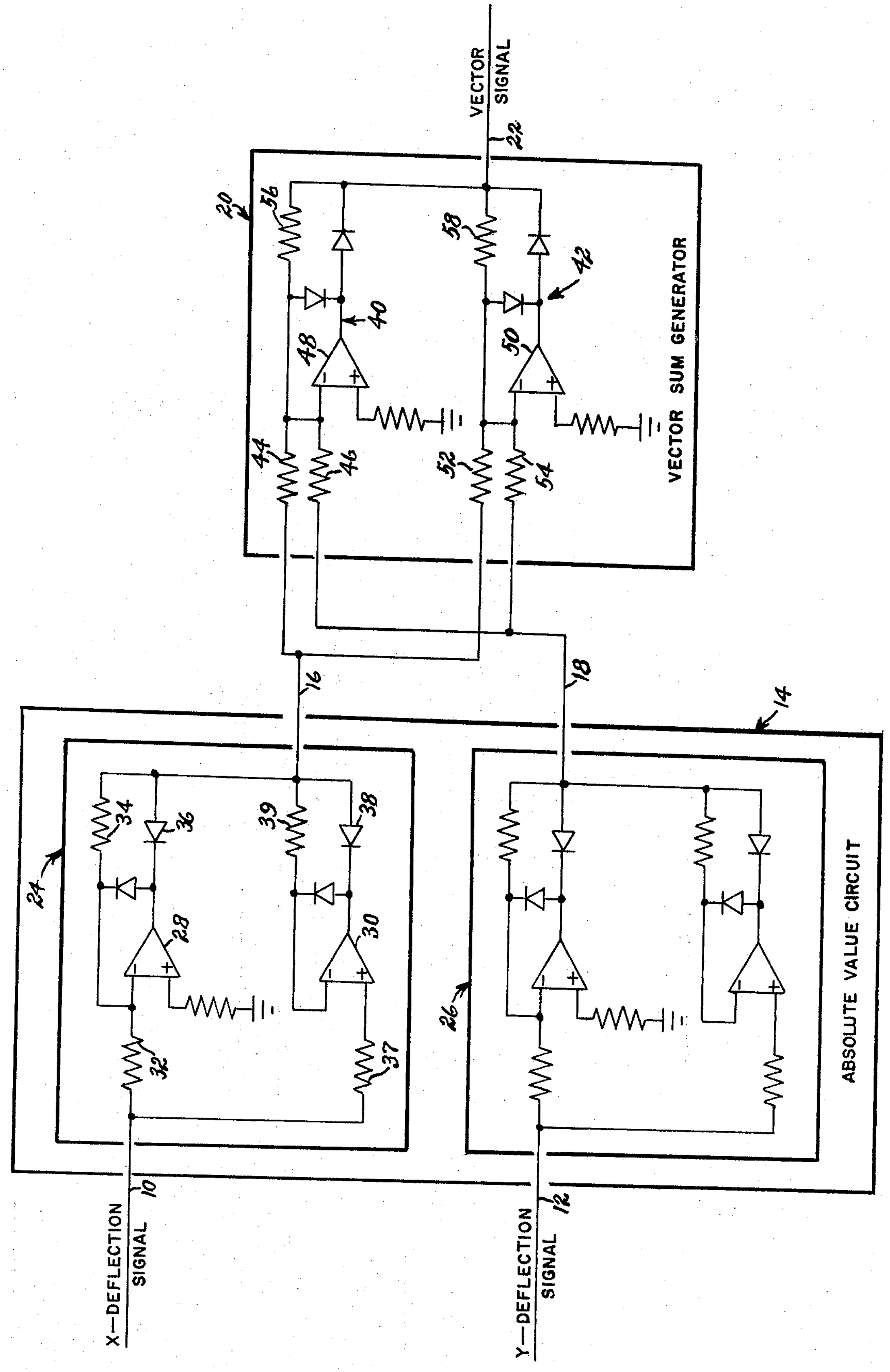
VECTOR SIGNAL
VECTOR SUM GENERATOR
ABSOLUTE VALUE CIRCUIT
X—DEFLECTION SIGNAL
Y—DEFLECTION SIGNAL

VECTOR MAGNITUDE SUMMING CIRCUIT

BACKGROUND OF THE INVENTION

The invention relates generally to the area of vector summation circuits; and specifically, the invention provides an analogue circuit of great simplicity which computes the vector magnitude of two input signals occurring in perpendicular directions.

There are many applications which require that the square root of the sum of the squares or a vector sum be calculated. For example, such calculations may be required in feed rate control circuits of a machine control or in determining a resultant deflection of a machine member. Further, many techniques have been devised for calculating the vector sum of input quantities occurring in mutually perpendicular directions. There are both analogue and digital circuits which execute the calculation directly, i.e. the squaring of each quantity, summing the squared quantities and taking the square root of the sum. At first glance, this may appear to provide the most accuracy; however, the accuracy of the resultant vectors will be a function of the quality of electrical components and the resolution of the numbers used in the calculation. In the case of a digital calculation, the resolution of the numbers used in the calculation will most probably be substantially less than the resolution of the numbers representing the input signals. In addition, the calculations with the digital circuits require substantially complex and expensive circuitry. Consequently, further digital circuits have been developed which calculate the vector sum by using an approximation technique which only requires addition and simple multiplication, i.e. number shifting in a digital control. However, even with the above approximation, considerable programming or circuitry is required to generate a cycle of events to execute the approximation. Further, typically the approximations require additional circuitry to determine which input signal is the larger.

Applicant has further simplified the above problem by using an approximation technique which requires a minimum of circuit elements. The approximation is accomplished with the analogue circuits; therefore, no timing or control apparatus is required. Since, in a great many situations, the input signals are derived from transducers or sensors which produce analogue signals; applicant's circuit may be used on the output thereof without consuming programming instructions or computer time.

SUMMARY OF THE INVENTION

According to one embodiment of the invention, applicant provides an apparatus for producing a vector signal representing the vector magnitude of two inputs signals. The input signals represent quantities which occur in perpendicular directions. The apparatus has means responsive to the input signals for producing corresponding control signals. The apparatus further includes first means responsive to the control signals for providing a first output signal. A second means is responsive to the control signals and connected to the first providing means for providing a second output signal. Said first and second providing means are further operative to compare the magnitudes of the output signals and maintain the larger output signal as the vector signal.

BRIEF DESCRIPTION OF THE DRAWING

The FIGURE illustrates the circuit elements contained in applicant's invention.

DESCRIPTION OF THE PREFERRED EMBODIMENT

As mentioned earlier, a typical application where the vector sum is required is the determination of a resultant deflection of a machine member; e.g., a machine spindle. A sensing apparatus (not shown) is responsive to spindle deflections and produces two signals which represent deflections in two perpendicular directions. The signals represent input signals to the circuit illustrated in the FIGURE. One of the input signals, on line 10, will be referred to as the X-deflection signal; and the other input signal, on line 12, will be referred to the Y-deflection signal.

An absolute value circuit 14 is responsive to the first and second input signals for producing corresponding first and second control signals on output lines 16 and 18, respectively. A vector sum generator 20 is responsive to the control signals for producing a vector signal on output line 22 representing approximately the vector sum of the input signals.

For proper operation of the vector sum generator 20, it is required that the control signals on lines 16 and 18 represent the magnitude of the input signals on lines 10 and 12 and have a predetermined polarity. In the present case, regardless of the polarity of the input signals, the control signals must have a negative polarity. This defines the function of the absolute value circuit 14 which is comprised of a first amplifier circuit 24 and a second amplifier circuit 26.

The amplifier circuits 24 and 26 are identical in operation and, therefore, only the operation of circuit 24 will be described. Within the circuit 24, an operational amplifier 28 is connected in the inverting mode; and an operational amplifier 30 is connected in the non-inverting mode. If the X-deflection signal is positive, the current path comprised of resistors 32 and 34 and diode 36, will cause operational amplifier 28 to produce a negative output signal equal to the magnitude of the input signal on line 10 plus the forward drop across diode 36. This produces a control signal on line 16 having a magnitude equal to the magnitude of the input signal but of opposite polarity. In this situation, the diode 38 prevents the operational amplifier 30 from controlling the signal on line 16. It should be noted that the resistors 32, 34, 37 and 39 are all of the same value.

In the case of a negative polarity on line 10, the amplifier 30 will produce a negative output equal to the magnitude of the input signal on line 10 minus the drop across diode 38. Consequently, the control signal on line 16 will be of a negative polarity and have a magnitude equal to the magnitude of the input signal. In this case, the diode 36 prevents the amplifier 28 from controlling the polarity of the signal on line 16. Therefore, the amplifier circuit 24 is responsive to the first input signal on line 10 to produce a first negative control signal on line 16; and the amplifier circuit 26 is responsive to the second input signal on line 12 to produce a second negative control signal on line 18. The necessity of a negative control signal is a function of the vector summation circuit 20.

The vector sum generator 20 is comprised of a first operational amplifier circuit 40 and a second operational amplifier circuit 42. Within the circuit 40, a first resistive element 44 is responsive to the first control signal on line 16 for scaling the first control signal by a first fractional constant. A second resistive element 46 is responsive to the second control signal on line 18 for scaling the second control signal by a second fractional constant. One end of the first element 44 is connected to one end of the second element 46 and the junction between the elements 44 and 46 is connected to one input of the operational amplifier 48.

In a similar manner, the circuit 42 contains an operational amplifier 50 having an input connected to a junction between a third resistive element 52 and a fourth resistive element 54. The resisitive element 52 is responsive to the first control signal for scaling the first control signal by the second fractional constant; and the fourth resistive element 54 is responsive to the second control signal for scaling the second control signal by the first fractional constant.

In the circuit 20, the resistors 56 and 58 are of the same value. Further, the value of resistors 44 and 54 is equal to the value of resistor 56 divided by 0.96; and the value of resistors 46 and 52 is equal to the value of resistor 56 divided by 0.4. Therefore, the first fractional constant is equal to 0.96 and the second fractional constant is equal to 0.4; and, the circuit 40 will produce an output signal according to the equation $V=0.96X+0.4Y$. The circuit 42 will produce an output signal according to the equation $V=0.4X+0.96Y$.

It should be noted that the calculation of the vector signal may be accomplished with either one of the circuits 40 or 42. However, in this situation, a comparison must, be made to determine which of the control signals is the larger, and the control signals must be appropriately gated to the circuit 40 or 42 to satisfy the equation V=0.96(larger signal)+0.4(smaller signal). The circuitry to accomplish the comparison and gating is more complex than that necessary for making the vector sum calculation twice and using only the larger result. Applicant has taken the latter approach.

Assume for purposes of explanation, that the output signal produced by the circuit 40 is larger than the output signal produced by circuit 42. Since the feedback resistors 56 and 58 are of the same value, operational amplifier 48 will dominate while the output of amplifier 50 will remain close to ground. Conversely, if the output signal from the circuit 42 is larger, the output of amplifier 50 will dominate and the output of amplifier 48 will remain close to ground. Consequently, by duplicating the calculation with relatively simple circuitry, a signal representing the vector sum can be produced without knowing the relative magnitude of the input signals.

It should be noted that the circuit shown will produce a vector signal of a positive polarity. A negative polarity may be obtained by reversing all of the diodes in the vector sum generator 20 and using positive control signals which are obtained by reversing the direction of the diodes in the absolute value circuit 14.

While the invention has been illustrated in some detail, according to the preferred embodiment shown in the accompanying drawing, and while the preferred illustrated embodiment has been described in some detail, there is no intention to thus limit the invention to such details. On the contrary, it is intended to cover all modifications, alterations and equivalents falling within the spirit and scope of the appended claims.

What is claimed is:

1. An apparatus for producing a vector signal representing approximately the vector magnitude of first and second input signals representing quantitative magnitudes occurring in perpendicular directions, the apparatus comprising:

a. means responsive to the first and second input signals for producing first and second control signals respectively;

b. a first means having an output and inputs connected to the producing means for modifying the first control signal by a first fractional constant and the second control signal by a second fractional constant to provide a first output signal therefrom; and c. a second means having an output connected to the output of the first modifying means and inputs connected to the producing means for modifying the first control signal by the second fractional constant and the second control signal by the first fractional constant to provide a second output signal therefrom, whereby said first and second means being operative to sustain as the vector signal the output signal having the larger magnitude.

2. The apparatus of claim 1, wherein the producing means further comprises:

a. a first amplifier circuit responsive to the first input signal for producing the first control signal of a first predetermined polarity; and b. a second amplifier circuit responsive to the second input signal for producing the second control signal of the first predetermined polarity.

3. The apparatus of claim 2, wherein the first modifying means further comprises:

a. a first resistive element responsive to the first control signal for scaling the first control signal by the first fractional constant;

b. a second resistive element having one end thereof forming a junction with one end of the first resistive element, said second resistive element being responsive to the second control signal for scaling the second control signal by the second fractional constant; and c. a first operational amplifier circuit having an input connected to the junction between the first and second resistive elements, said first operational amplifier circuit providing on an output thereof the first output signal having a first magnitude and a second predetermined polarity.

4. The apparatus of claim 3, wherein the second modifying means further comprises:

a. a third resistive element responsive to the first control signal for scaling the first control signal by the second fractional constant;

b. a fourth resistive element having one end thereof forming a junction with one end of the third resistive element, said fourth resistive element being responsive to the second control signal for scaling the second control signal by the first fractional constant; and c. a second operational amplifier circuit having an output connected to the output of the first operational amplifier circuit and an input connected to the junction between the third and fourth resistive elements, said second operational amplifier circuit providing on the output thereof the second output signal having a second magnitude and the second predetermined polarity, whereby said first and second operational amplifier circuits being operative to compare the magnitudes of the first and second output signals and maintain as the vector signal the output signal having the greater magnitude.

5. The apparatus of claim 4, wherein said first fractional constant being approximately equal to 96/100.

6. The apparatus of claim 5, wherein said second fractional constant being approximately equal to 4/10.

7. The apparatus of claim 6, wherein each of said first and second operational amplifier circuits further comprises:

a. an operational amplifier connected in the inverting mode and having one input connected to the junction between the resistive elements;

b. a unidirectional conducting device having an anode connected to an output of the amplifier and a cathode;

c. a resistive element connected between the cathode of the unidirectional conducting device and the junction between the resistive elements.

8. The apparatus of claim 7, wherein the cathodes of the unidirectional conducting devices in the first and second operational amplifier circuits are connected together.

9. The apparatus of claim 8, wherein each of the first and second operational amplifier circuits further comprises a second unidirectional conducting device having an anode connected to the junction between the resistive elements and a cathode connected to the output of the operational amplifier.

10. An apparatus for producing a vector signal representing approximately the magnitude of the vector sum of first and second input signals representing quantitative magnitudes occurring in perpendicular directions, the apparatus comprising:

a. means responsive to the first and second input signals for producing first and second control signals, respectively, having a predetermined polarity; and b. means responsive to the control signals for generating first and second output signals representing first and second approximations of the vector sum, said generating means including further means for comparing the output signals and maintaining the larger output signal as the vector signal.

* * * * *